US012579565B1

(12) United States Patent
Mishra et al.

(10) Patent No.: US 12,579,565 B1

(45) Date of Patent: Mar. 17, 2026

(54) REVIEW GENERATION USING FINE-TUNED GENERATIVE LANGUAGE MODELS

(71) Applicant: Amazon Technologies, Inc., Seattle, WA (US)

(72) Inventors: Pragyana K. Mishra, Seattle, WA (US); Praveen Gupta, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 329 days.

(21) Appl. No.: 18/126,894

(22) Filed: Mar. 27, 2023

(51) Int. Cl.
*G06Q 30/0601* (2023.01)
*G06F 40/20* (2020.01)
*G06F 40/40* (2020.01)

(52) U.S. Cl.
CPC ......... *G06Q 30/0631* (2013.01); *G06F 40/20* (2020.01); *G06F 40/40* (2020.01)

(58) Field of Classification Search
CPC ........... G06Q 30/0623; G06Q 30/0625; G06Q 30/0627; G06Q 30/0631; G06F 16/345; G06F 40/30; G06F 40/284; G06F 40/20; G06F 40/35; G06F 40/40; G06F 40/56; G06F 18/211
See application file for complete search history.

(56) References Cited

U.S. PATENT DOCUMENTS 8,533,051 B2 * 9/2013 Platek ................ G06Q 30/0641 705/26.4
11,281,734 B2 * 3/2022 Zadorojniy ......... G06F 16/9535
11,321,759 B2 * 5/2022 Adams ............... G06Q 30/0625
12,050,876 B2 * 7/2024 Tunstall-Pedoe .... G06N 3/0455
12,147,649 B2 * 11/2024 Bodell ............... G06Q 30/0627
12,217,013 B2 * 2/2025 Sabapathy .............. G06F 40/35
12,417,359 B2 * 9/2025 Hayes .................... G06N 3/047
2011/0004508 A1 * 1/2011 Huang ................... G06Q 30/00 705/7.32
2014/0214622 A1 * 7/2014 Kaneko ............. G06Q 30/0625 705/26.62
2020/0201913 A1 * 6/2020 Terry ................. G06Q 30/0281
2021/0374355 A1 * 12/2021 Salter .................... H04L 51/046
2022/0036424 A1 * 2/2022 Almeida ............ G06Q 30/0627
2022/0414741 A1 * 12/2022 Ozcan ................ G06Q 30/0643
2023/0078698 A1 * 3/2023 Shnarch ................ G06F 40/279 704/9
2024/0346233 A1 * 10/2024 Paulino ................. G06F 40/166
2025/0217600 A1 * 7/2025 Ouyang ............. G06Q 30/0282
2025/0225314 A1 * 7/2025 Sharpe ................... G06N 3/045
(Continued)

FOREIGN PATENT DOCUMENTS

WO WO-2019119916 A1 * 6/2019 ............ G10L 15/22

*Primary Examiner* — Richemond Dorvil
(74) *Attorney, Agent, or Firm* — K&L Gates LLP

(57) ABSTRACT

Devices and techniques are generally described for generating content reviews using language models. In some examples, first text data may be determined for a first item. The first text data may include a plurality of user reviews of the first item. In various examples, the first text data may be input into a generative language model. In some cases, the generative language model may generate second text data including a first consensus review for the first item. In some examples, the second text data may be displayed on a graphical user interface in association with a listing for the first item.

18 Claims, 8 Drawing Sheets

(56) References Cited

U.S. PATENT DOCUMENTS

| | | | | |
|---|---|---|---|---|
| 2025/0285377 | A1* | 9/2025 | Khorramshahi ........ | G06T 17/00 |
| 2025/0292302 | A1* | 9/2025 | Bennett .................. | G06N 3/042 |
| 2025/0307548 | A1* | 10/2025 | Neerukonda ........ | G06N 3/0895 |

* cited by examiner

700

710 — Fine-tune pre-trained LLM using reinforcement learning with two-step PPO with general corpus reviews and vetted reviews 712 — Fine-tune LLM using similar item review comparison to generalize LLM 714 — Generate multiple reviews for given item and display each review to different user cohort 716 — Measure user feedback signals for different cohorts and fine tune LLM using reward function

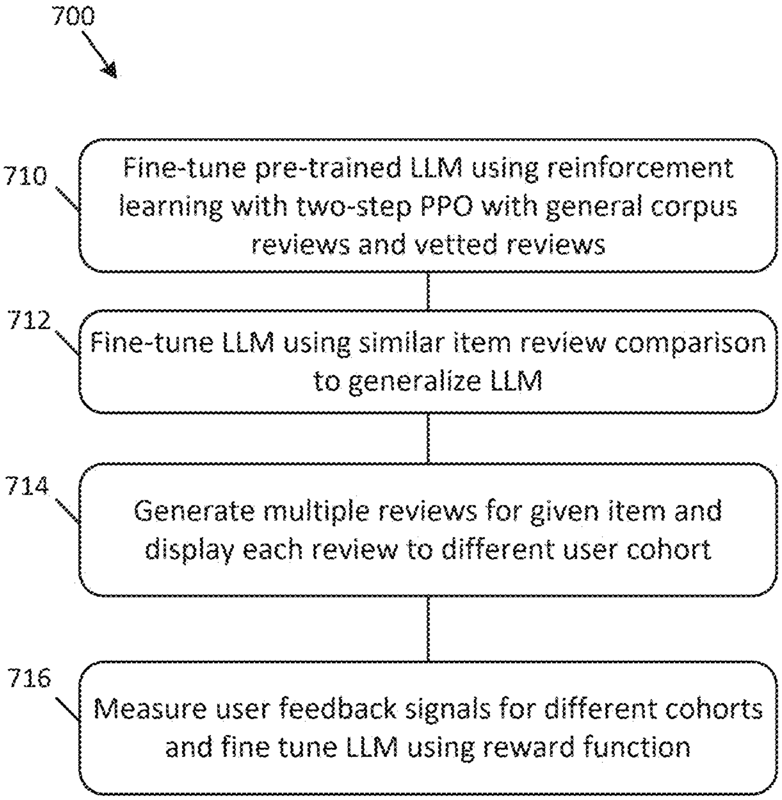

FIG. 7

REVIEW GENERATION USING FINE-TUNED GENERATIVE LANGUAGE MODELS

BACKGROUND

Electronic catalogs may be accessible via electronic pages, such as web pages or content pages displayed by a browser or mobile shopping application, with the electronic pages providing front-end user interfaces into the electronic catalogs. An example electronic page may enable users to provide verbal or textual user input reviewing content and/or answering questions about content that the user may have purchased or have knowledge about. In various examples, the reviews may be useful to other users who may be considering selecting the same content. Detailed reviews may provide other users with insights about the content such as quality, usefulness, user satisfaction, item details, etc., concerning the content. Users may also search reviews for specific item details that are important to them.

BRIEF DESCRIPTION OF DRAWINGS

FIG. 7 depicts another example process for fine-tuning a pre-trained generative language model to reduce bias and increase generality using available signals, in accordance with various aspects of the present disclosure.

DETAILED DESCRIPTION

Figure 1:
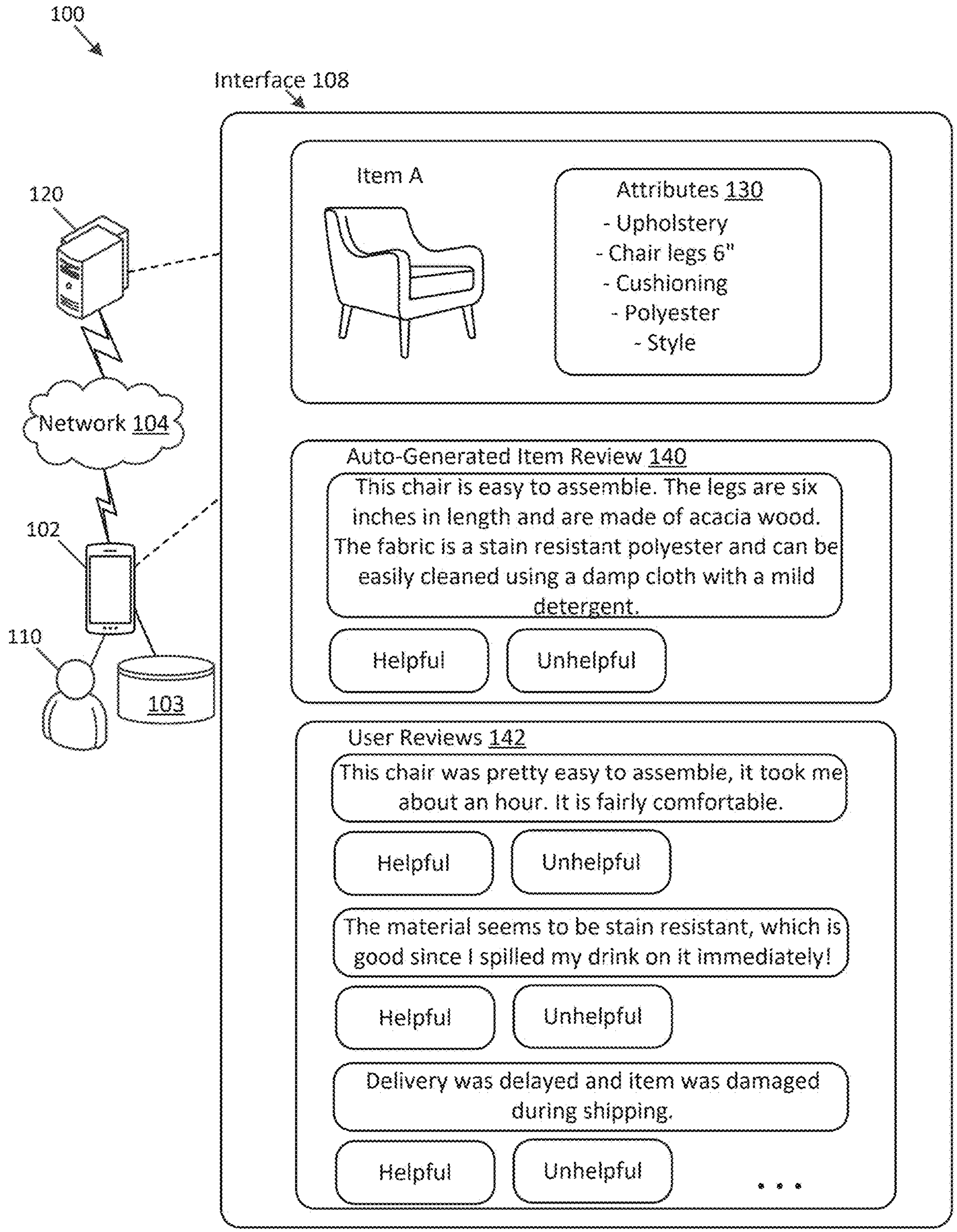
FIG. 1 is a block diagram depicting an example user interface and system effective to generate consensus item reviews using a generative language model fine-tuned to reduce bias and review toxicity, in accordance with various aspects of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Item reviews and question-and-answer pages for items (e.g., content such as digital media, physical items, etc.)) provide individuals with detailed insights about various aspects of the item such as quality, usefulness, item details, unique attributes, defects, etc. These reviews, which often provide in-depth analysis and evaluation of the items, help users make informed and unlamented decisions when selecting between different items. However, with the growing number of reviews for each item, user-generated reviews and/or question answers may become verbose, repetitive, biased, and of varying quality. Manually reviewing each user-generated review by a user to find meaningful and relevant information about a product may be cumbersome in the face of a large and ever-expanding number of user-generated reviews (or user-generated question answers).

One approach to alleviate this burden may be to summarize the reviews (e.g., using a review summarization machine learning model). However, summarizing user-generated reviews may not be helpful in many cases, primarily because the summaries are biased and influenced by the clutter and noise in the content (the user-generated reviews themselves). The summaries are neither expressive nor conversational; they capture frequently-mentioned lines in reviews without any understanding of what constitutes a high quality review. Additionally, key-word based approaches that find keywords that are mentioned in the reviews do not highlight all relevant item attributes. Among other issues, user-generated reviews tend to have a "negativity bias"—with users that write reviews tending to favor negative information over positive information of equal value/relevance. This negativity bias creeps into any generative model trained on user-submitted reviews (or any other user-generated content). To overcome these issues, described herein are techniques that use available signals to fine-tune generative large language models (LLMs) using reinforcement learning for the task of automatic generation of consensus reviews that describe the most important item features, avoid negativity bias and/or toxicity, and succinctly describe the relevant features of an item in a meaningful way. In addition, such fine-tuned LLMs may be used to automatically generate high-quality answers to user submitted questions while the user waits for any user-submitted responses to their questions. Additionally, the fine-tuned LLMs described herein are able to generate consensus reviews/answers in conversational and colloquial language so that it sounds natural and informational to a user.

Generative Pre-trained Transformers (GPT) are generative models that can generate meaningful and highly-relevant text (and/or other modalities such as images, video, etc.) that describe some topic, once the model is trained on the relevant dataset (e.g., item review text, in this context). Such review datasets may be used to refine (e.g., fine-tune) a generative model that has been trained on a general text corpus (e.g., trained using large general text datasets, often scraped from publicly available data sources, such as the Internet). Fine-tuning such pre-trained language models may enable the resulting fine-tuned model to generate reviews that best capture the attributes and evaluation of a given item.

In various examples described herein, pretrained generative language models may be fine-tuned using two separate review datasets. The first dataset may be the general corpus of review data from past user-generated reviews of items. The second may be a vetted dataset of quality reviews. The vetted dataset may be a manually curated set of reviews, either selected from the general reviews by professional content curators or generated by such specially-trained content reviewers, or may be sourced from a high-quality review website or authoritative source (e.g., review sites such as WireCutter, TechCrunch, CNET, GearLab, consumer reports, etc.) In some other examples, the vetted review dataset may also be created automatically from general user reviews based on signals such as the number of likes and/or other users that found a particular review helpful. As described in further detail below, the fine-tuned generative language models described herein have various advantages and differences between previous models that enable improved text generation in the automatic review and/or question-answering contexts.

For example, the generative language models described herein may be trained on ranked reviews, known item details (from a data store), and other already available signals that may be used automate the fine-tuning process without requiring human-in-the-loop data annotation and/or ranking of the training data (e.g., the review datasets). In another example, a two-step proximal policy optimization (PPO) may use the general review corpus and the much smaller set of vetted or high quality reviews to minimize model bias and/or toxicity.

The ranked reviews may be used for prompts that are used for generating the reviews or for answering questions about the item (e.g., as inputs to the various fine-tuned generative language models described herein). Salient item details and lines extracted from the ranked reviews can be used for augmenting the prompt. The automated generation of reviews is dependent on the augmented prompt.

In some further examples, holdout reviews may be used to improve the refinement of the generative language models for the review generation task. For example, similar items may be determined along various attribute dimensions to determine overall item similarity. Past LLMs (e.g., InstructGPT, GPT-3.5, ChatGPT) do not perform well for broad groups of users in terms of generalizing well to the preferences of a "held-out" or exemplary review. The fine-tuning and prompt-tuning approaches described herein, compares auto-generated consensus reviews for a given item to a held-out review for a similar item using an A/B style test for generalization. This approach assumes that two similar items (e.g., two keyboards with similar features, but from different manufacturers) should be reviewed along the same or similar item attributes/details. This approach is sued to generate consensus reviews that generalize well across items of the same type/category (e.g., general ledger categories). The reward function of the reinforcement learning technique rewards the model for generating reviews for similar items that describe a similar set of features.

In yet other examples, a bandit approach may be used to select a review and fine-tune the review as the review is generated and presented for an item. For example, multiple reviews may be auto-generated for a given item. Each auto-generated review may use a custom prompt that uses a set of item details or retrieved lines from top-ranking reviews. Each auto-generated review may be provided to a different cohort of users. The reward function of the reinforcement learning techniques may reward those reviews that are deemed most helpful by the users over those reviews that are deemed less helpful to progressively refine the review. The LLM may be progressively fine-tuned across multiple items and review cycles to supervise the model in an automated manner.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

As previously described, in some examples, the generative language models described herein may be implemented using transformer models that may be fine-tuned for the review-generation and/or question-answer generation task. Transformer models (e.g., transformer machine learning models) are machine learning models that include an encoder network and a decoder network. The encoder takes an input and generates feature representations (e.g., feature vectors, feature maps, etc.) of the input. In natural language processing, transformer models take sequences of words as input. For example, a transformer may receive a sentence and/or a paragraph comprising a sequence of words as an input.

In general, the encoder network of a transformer comprises a set of encoding layers that processes the input data one layer after another. Each encoder layer generates encodings (referred to herein as "embeddings"). These embeddings include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its output to the next encoder layer. The decoder network of the transformer takes the output embeddings by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i=x_i W_Q$, a key vector $k_i=x_i W_K$, and a value vector $v_i=x_i W_V$. Attention weights are calculated using the query and key vectors: the attention weight di from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $\alpha_{ij}$, the attention from i to each token.

The attention calculation for all tokens can be expressed as one large matrix calculation, which is useful for training due to computational matrix operation optimizations which make matrix operations fast to compute. The matrices Q, K, and I' are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In various examples, the generative language models described herein may be generative pre-trained transformers that are fine-tuned for the specific tasks discussed herein using reinforcement learning. Reinforcement learning is a type of machine learning that involves modifying the parameters of the model based on trial and error. The goal of reinforcement learning is to teach the model to take actions that maximize a cumulative reward that is defined by the object function (e.g., the reward function) of the reinforcement learning algorithm.

In reinforcement learning, the model is presented with a task (e.g., review generation, item question answering, etc.) and the model receives feedback in the form of a reward or penalty (defined by the objective function) based on the actions taken by the model. The model's parameters are updated based on this cumulative reward calculated mathematically from the objective function. Specifically, the model's parameters are updated to maximize the cumulative reward.

Proximal policy optimization (PPO) is a type of reinforcement learning algorithm that may be used to train models to perform specific tasks (such as the review generation and item question answering tasks described herein). PPO is an on-policy algorithm, meaning that it learns from the data it generates while interacting with the environment.

PPO constrains the updates made to the policy during training so that the policy does not change too much from iteration to iteration. This is achieved by introducing a proximal penalty term in the objective function that encourages to the new policy to stay close (mathematically) to the old policy. PPO reinforcement learning algorithms may be more sample efficient than other algorithms enabling the model to learn from fewer interactions with the environment. Additionally, PPO is often less prone to model overfitting and instability during training. In the examples discussed herein, a two step PPO reinforcement learning algorithm is used to overcome toxicity and bias (e.g., a bias toward negative reviews) in the training data, as described in further detail below.

FIG. 1 is a block diagram depicting an example user interface and system 100 effective to generate consensus item reviews using a generative language model fine-tuned to reduce bias and review toxicity, in accordance with various aspects of the present disclosure.

As depicted in FIG. 1, a user 110 may interact with a computing device 102. Computing device 102 may be, for example, a desktop computing device, a laptop, a mobile device (e.g., a smartphone), a tablet, an embedded system, etc. In the example depicted in FIG. 1, user 110 be viewing an item detail page for a particular item (e.g., on a website, mobile application, etc.). In the example depicted in FIG. 1, the interface 108 depicts an item detail page for a chair (Item A). The chair may be content (e.g., an item) that the user has selected and is investigating (e.g., for a potential purchase).

Interface 108 may be, for example, a graphical user interface (GUI) displayed on computing device 102. For example, interface 108 may be a GUI of an e-commerce service (e.g., displayed via an application and/or as a website). In various examples, one or more computing devices 120 that are located remotely vis-à-vis the computing device 102 may provide executable code to cause the interface 108 to be displayed on the user 110's local computing device 102. In some examples, the one or more computing devices 120 may execute the fine-tuning techniques described herein to fine-tune a generative language model for automated review text generation and/or automated question answering, as described herein. After fine-tuning, the resulting generative language model(s) may be executed by computing devices 120, computing device 102, and/or some combination thereof.

The interface 108 may be displayed on a display (e.g., a display associated with computing device 102). In another example, the user interface may not be displayed, but instead may be a voice-controlled interface wherein the user provides verbal reviews and a voice assistant transcribes and/or stores such reviews in association with the relevant content. In still further examples, some combination of visual and audio interfaces may be provided. Computing device 102 may communicate with one or more of the other components depicted in FIG. 1 over a network 104 such as a local area network (LAN) and/or a wide area network (WAN) such as the internet. For example, computing device 102 may communicate with the one or more back-end computing devices 120 via network 104. In various examples, one or more non-transitory computer-readable memories 103 may be configured in communication (e.g., directly and/or via network 104) with computing devices 102 and/or the one or more computing devices 120. The one or more non-transitory computer-readable memories 103 may store instructions that, when executed by at least one processor of computing device 102 and/or the one or more computing devices 120, are effective to program the at least one processor to perform one or more of the various techniques described herein.

In the example depicted in FIG. 1, Item A may be associated with one or more attributes 130 (attribute data). In the example shown, the attributes may specify a type of upholstery, detail about the chair legs (including that they are six inches in length), details about the chair's cushioning, material details (e.g., such as that the chair's fabric is made of polyester), details about the chair's style, dimensions, weight, etc. The various attributes 130 may be stored in a data store in association with data that identifies Item A and may be displayed when the user 110 navigates to a detail page associated with Item A. In addition, one or more images of Item A may be stored in the data store and may be displayed on the item detail page.

Once fine-tuned using the various techniques described herein, the fine-tuned generative language model may generate an auto-generated item review 140 for the relevant item (e.g., Item A in the example of FIG. 1). In various examples, the generative language model may be a pre-trained LLM that is fine-tuned using reinforcement learning on a large corpus of user-generated item reviews. The corpus of user-generated item reviews may be ranked based on review ratings (e.g., how many users selected the review as "Helpful" (e.g., using a selectable graphical control, as shown in FIG. 1), liked the review, added the item to a cart after displaying or clicking on the review, etc. Since these signals are already available through the application and/or service (e.g., the e-commerce service), the generation of the training data used during training is automated. The fine-tuned generative language model learns to generate high quality reviews that touch upon the most salient aspects of the item, as described in past user reviews that were found to be most helpful (as evidenced by the various available feedback signals (e.g., user response data) described above). Additionally, negativity bias and review toxicity may be mitigated using a two-step proximal policy optimization (PPO) in which the generative language model is first fine-tuned using the general corpus of reviews followed by fine-tuning the generative language model (e.g., modifying the parameters of the model) using a much smaller number of vetted and/or high-quality reviews. This may be useful, since often, users that obtain an item may be motivated to write a review when there is some problem or when the user's have negative sentiment toward the item, more often that when users are satisfied with one or more aspects of the item. Accordingly, a negativity bias exists in the training data. If this negativity bias in the training data is not accounted for, the model may often learn to generate overly negative reviews that overly focus on negative aspects and/or drawbacks of items without mentioning corresponding positive features and/or aspects of the item.

After fine-tuning the generative language model using embeddings of the user-generated reviews for a selected item (e.g., user reviews 142) and embeddings of the attributes 130, the generative language model may output the auto-generated item review 140 based on an input prompt. Additionally, text is displayed on the interface 108 in association with the auto-generated item review 140 to inform the user 110 that the review has been automatically generated by an artificial intelligence system, so that the user does not think that the review was generated by another user with firsthand experience of the item. However, the auto-generated item review 140 represents a fluent review that is coherent and that describes those features of the item that other users have found to be the most important, based on the signals available to the model. Additionally, as described herein, the generative language model may be fine-tuned in such a way that it learns to avoid negativity bias and/or irrelevant subject matter, which may be prevalent in the corpus of user reviews. For example, the bottom-most user review 142 shown in FIG. 1 states that "Delivery was delayed and item was damaged during shipping." This review is not related to Item A itself, but is instead related to the shipping. This review is off-topic with respect to the Item. The generative language model may learn to avoid such off-topic reviews during fine-tuning.

Figure 2:
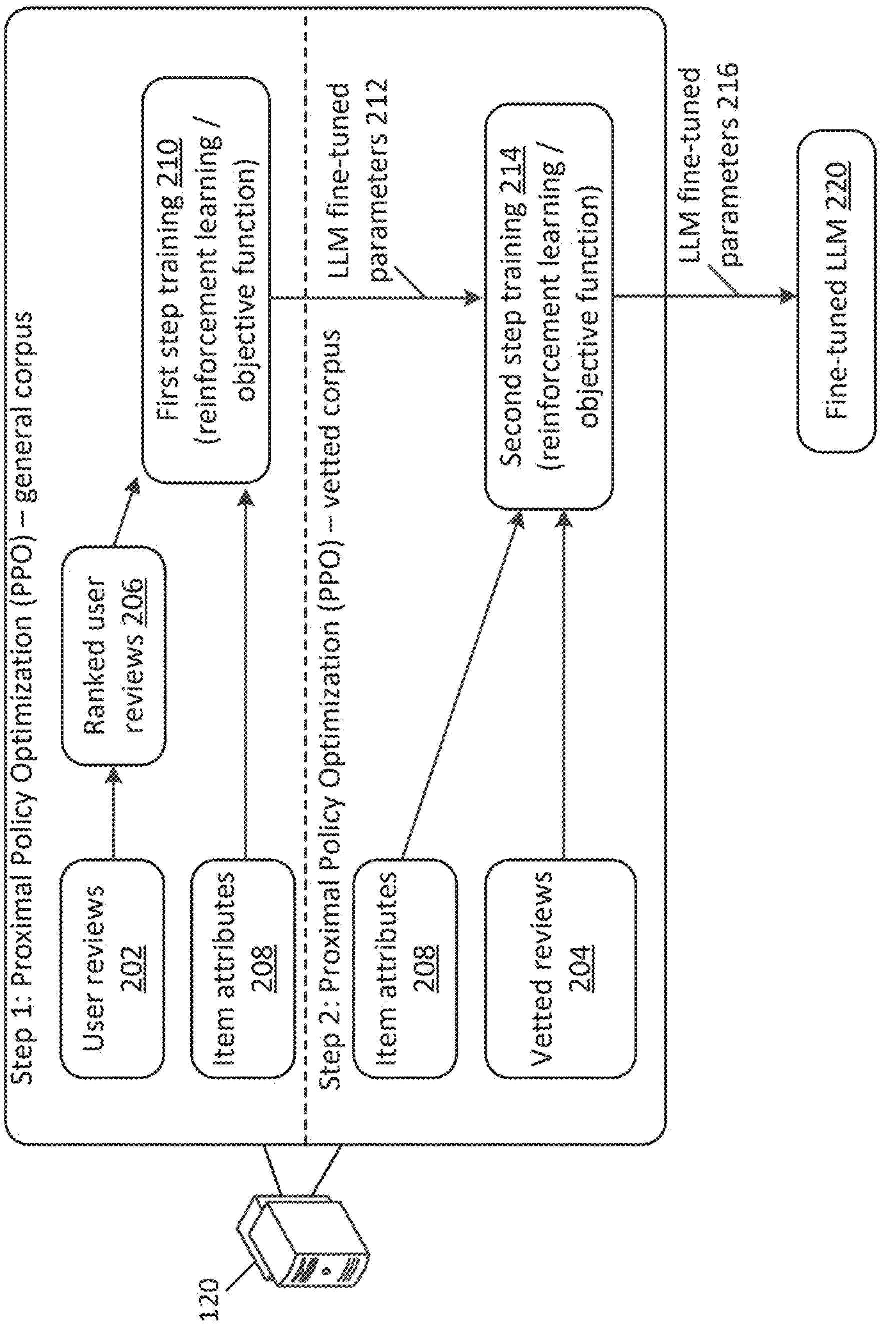
FIG. 2 depicts an example process for fine-tuning a pre-trained generative language model using reinforcement learning, in accordance with various aspects of the present disclosure.

FIG. 2 depicts an example process for fine-tuning a pre-trained generative language model using reinforcement learning, in accordance with various aspects of the present disclosure. There may be a corpus of existing user-generated reviews (user reviews 202) across a plurality of items (e.g., existing reviews for items of an e-commerce service). In addition, there may be feedback signals available for these existing user reviews 202 that may be used to rank the reviews (e.g., on a per-item basis). Such signals may vary from implementation-to-implementation, but may include such data as data indicating a number of times that users clicked a "like" button and/or a "Helpful" button (as shown in FIG. 1) indicating that the review was helpful or useful to them. Other signals may include clickstream data and/or views indicating that a user viewed a particular review followed by performing an add-to-cart or conversion operation with respect to the item. Some other examples may include clickstream data and/or view data indicating that a user navigated away from the item, indicated that the review was off-topic (e.g., using a selectable graphical control, etc.). In some examples, these signals may be used to generate a weighted ranking score for the item. For example, the number of likes of a first review for an item may be weighted by a first weight value and the number of add-to-carts performed after viewing the first review may be weighted by a second weight value and these weighted values may be combined to generate a score for the first review. In another example, a ratio of "likes" to "dislikes" for each review may be used to generate review scores. Reviews, for each item, may be ranked using such scores in order to generate a per-item list of ranked user reviews 206. Additionally, since only a certain number of reviews may be displayable at a given time (due to a potentially large number of reviews) other weighting mechanisms may be used to account for the number of times the reviews were surfaced by users relative to the number of likes and/or add-to-carts performed after viewing such reviews when ranking the reviews.

In addition to the ranked user reviews 206 embedding data representing the item attributes 208 may be determined for each item. This data may be represented in a particular schema in a database entry for each item. Examples of attributes 208 may include item materials, dimensions, weight, type, color, general ledger category, etc. These attributes 208 may be encoded/embedded in a variety of ways for input into the model for training. As previously described, the general corpus of reviews (e.g., the ranked user reviews 206 and the item attributes) may be used to update the generative pre-trained transformer (or other LLM) during a first step of a PPO using reinforcement learning (action 210) to generate LLM fine-tuned parameters 212.

The reward function ranks the reviews generated for a given prompt. Ideally, the reviews auto-generated by the models should be more similar to the high-quality/vetted reviews or most helpful reviews. Accordingly, the reward function maximizes the order of the ranking of the generated reviews based on their similarity to the high-quality/vetted or most helpful reviews. There is no need of data from human labelers for training the reward model. The reward function may also be computed based on A/B style comparison of reviews as described in further detail below.

Since all of the underlying data used to generate this training data is already available, and the rankings may be programmatically calculated without a human-in-the-loop, the entire Step 1 training process may be automated. The parameters of the generative pre-trained transformer (or other LLM) may be updated to maximize the cumulative reward of the objective function during the Step 1 training phase of the PPO.

At Step 2, a smaller number of high-quality and/or vetted reviews may be used to limit the negativity bias and/or toxicity that may be present in the general corpus of reviews. The high-quality and/or vetted reviews may be vetted by a human expert and/or may be taken from a data source that is known to have high quality and/or vetted reviews associated with it. For example, a human may select certain well-written reviews that describe a majority of the item's attributes 208 as vetted reviews. In other examples, the high-quality reviews may be those selected from a certain review website that is known to provide high-quality, detailed reviews that touch upon the salient aspects of item (e.g., review sites like WireCutter, TechCrunch, CNET, GearLab, consumer reports, etc.). These vetted reviews 204 (or high quality reviews) may be embedded and input into the LLM (which may initially have the LLM fine-tuned parameters 212 after Step 1 of the PPO) along with the embedded item attributes 208. During the second step training 214, the parameters of the LLM may be further updated to maximize the cumulative reward of the objective function. After completion, the LLM fine-tuned parameters 216 may be learned (e.g., the parameters of the fine-tuned generative language model) and the fine-tuned LLM 220 may be used for inference (e.g., for generation of per-item review text). After training, the fine-tuned LLM 220 may take as input the item attributes for a given item (e.g., the attributes of the chair in FIG. 1) and the user reviews for that item, and may generate a consensus review (e.g., auto-generated item review 140) that may represent a consensus message for the user reviews for that item which is both well written and touches upon all salient item features that other users found to be important.

The vetted reviews may be combined with the user-submitted reviews for a batch-based approach to fine tuning the model. Additionally, the high-quality and/or vetted reviews may serve as a source for prompt tuning or augmenting the prompts in the generative stage.

Figure 3:
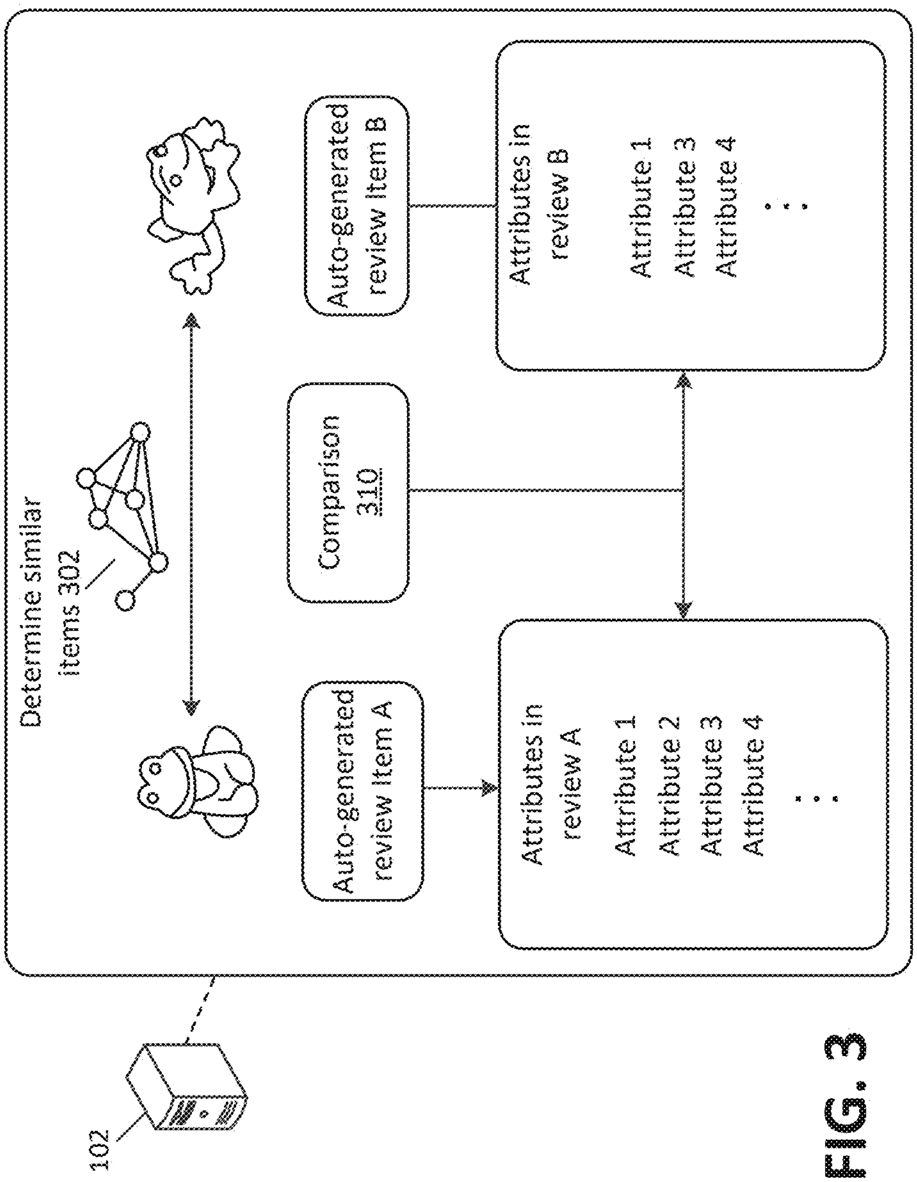
FIG. 3 depicts an example process for increasing the generality of a pre-trained generative language model through fine-tuning using holdout reviews, in accordance with various aspects of the present disclosure.

FIG. 3 depicts an example process for increasing the generality of a pre-trained generative language model through fine-tuning using holdout reviews, in accordance with various aspects of the present disclosure. Item attributes may be embedded and an overall vector representation (e.g., a vector representing a given item along a plurality of dimensions (e.g., one dimension for each attribute of the item)) may be generated for each item. This enables mathematical similarity comparison of items (e.g., by determining cosine similarity, Euclidean distance, etc.) of the different representative vectors for an item. The general notion is that items with vector representations that are closer to one another in the multi-dimensional vector space (a shared vector space with respect to the different items) are more similar to one another than items with vector representations that are further apart from one another.

On this basis, similar items 302 may be determined. In the example of FIG. 3, the similar items may be plush toy frogs (although any items may be compared using these techniques). These items may be similar in that they both represent the same type of animal (a frog), the are both plush toys, they may be similarly sized, of similar colors, etc. The fine-tuned LLM 220 may be used to generate consensus reviews for each of the two similar items, as described above. As shown in FIG. 3, auto-generated review for Item A (the item on the left) and auto-generated review for Item B (the item on the right) may be generated. These auto-generated reviews may be compared (at comparison 310) to determine the number of attributes described in each of the auto-generated reviews. One of the two reviews may be selected (automatically selected) as a hold out review. In the example of FIG. 3, the auto-generated review for Item A may be selected as a holdout review. This holdout review describes at least Attributes 1-4. The intuition is that the auto-generated review for Item B, a similar item to Item A, will include a similar set of attributes. As shown in FIG. 3, the auto-generated review for Item B, describes Attributes 1, 3, and 4, but not Attribute 2. This A/B style comparison may be used to determine the quantitative similarity between auto-generated reviews. The objective function of the reinforcement learning method used to fine tune the LLM may include one or more terms to maximize this similarity. Since the item similarity data (e.g., the item attributes) is already available and stored in a database, this similarity comparison may be made in an automated manner, without requiring any human-in-the-loop. Such selection of hold out reviews and comparison may be useful to help ensure that the model generalizes reviews well across different item categories.

Figure 4:
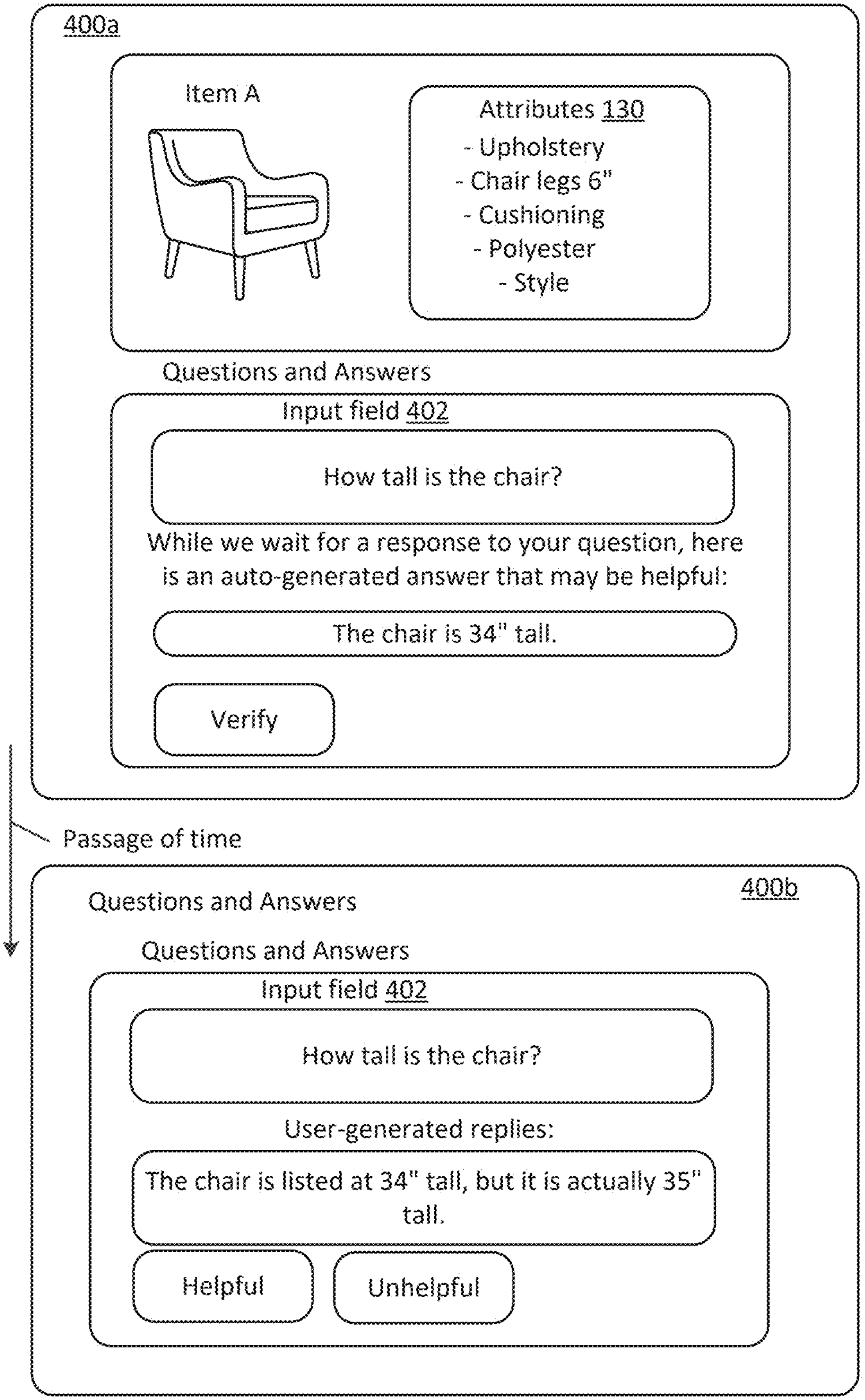
FIG. 4 depicts an example user interface and system effective to generate automated answers to user questions, in accordance with various aspects of the present disclosure.

FIG. 4 depicts example user interfaces 400*a* and 400*b* and a system effective to generate automated answers to user questions, in accordance with various aspects of the present disclosure. In addition to being trained for generation of automated item reviews, similar techniques may be used (e.g., the techniques described above in reference to FIGS. 2-3) to fine-tune a pre-trained generative transformer (or other LLM) to generate automated answers to user questions.

Typically, a user may submit a question regarding a particular item (e.g., Item A) in a field of a GUI (e.g., input field 402). In the example of FIG. 4, the user has input the question "How tall is the chair?" In current systems, a user must then wait for a response (e.g., either from an entity that manufactures or sells the chair or from some other user that purports to have knowledge of the item). This lag may result in the user forgetting about the item, navigating away, making a different decision, etc., and may result in a frustrating and/or slow experience for the user.

Accordingly, in the example depicted in FIG. 4, an autogenerated answer to the user's input question may be generated by a fine-tuned LLM trained as described above. For example, the two-step PPO reinforcement learning technique may be used with a general corpus of user questions and answers and the per-item attributes. Additionally, high quality and/or vetted user questions and answers may be identified and used during Step 2 of the PPO. Similarly, an A/B style test of auto-generated answers to the same question for two similar products may be used to further refine the model, as described in the example of FIG. 3.

As with the auto-generated reviews, text may be displayed to inform the user that the answer to their question has been auto-generated while the system awaits a user-generated response. In the example user interface 400*a*, the text "While we wait for a response to your question, here is an auto-generated answer that may be helpful" is displayed. The auto-generated answer (e.g., a predicted answer to the user question) in the example is: "The chair is 34" tall." Additionally, a graphical user control is displayed wherein a user can verify the auto-generated answer. This verification signal may be used in the objective function to further refine the answer and/or the model generally.

Additionally, after some passage of time, a user may generate a response. This response may supplant and/or replace the auto-generated response, and/or may be displayed in conjunction. In this example, the user-generated response contradicts the auto-generated response. This may be used as another signal (e.g., to decrease the cumulative reward in the objective function and/or impose a penalty) during model fine-tuning.

A prompt is a short text (set of tokens/words/sentences) that is submitted to the generative language model (as fine-tuned according to the techniques described herein) to seed the creation of a response. The short text can be a set of words or tokens, a question, one or more sentences to provide context, or a combination of all. For example, the prompt for generating the review of the chair in FIG. 1 can be "The mid-century modern upholstered accent chair has solid wood armrests combined with button-tufted design. Based on this information and user reviews on the detail page XYZ, write the review of this chair." The prompt, as shown here, is augmented by the line "The mid-century modern upholstered accent chair has solid wood armrests combined with button-tufted design", which may be retrieved from a vetted review, consumer report, independent product review service, or the most-helpful review.

The prompt is comprises two parts: first, the augmented set of lines that set the context for the item's review and second, the instruction to generate the review or answer a specific question. The augmented lines for context may be text retrieved from the item description, vetted/high-quality reviews, most-helpful review, or an independent product review source. The instruction to generate the review or answer the specific question may refer to other data (such as the reference to the detail page of the specific item, in the current example). In various examples, the prompt may comprise user preferences that may be associated with past user behavior. For example, based on past views and/or add-to-carts for the user, a different machine learning model may learn that the user prefers organic, locally-made goods over mass-produced goods. Accordingly, the terms "locally-made" and/or "organic" may be added in the prompt so that the auto-generated review may describe whether or not the particular item is locally-made and/or is organic-features that are important to the user.

Figure 5:
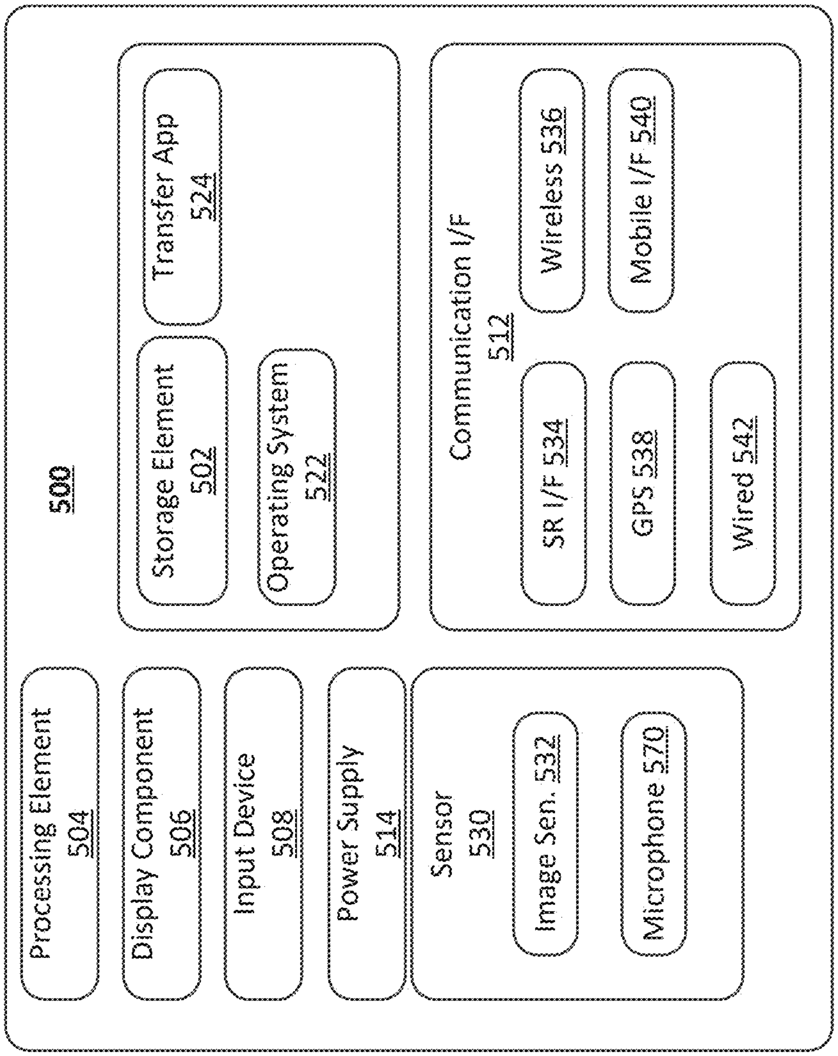
FIG. 5 is a block diagram showing an example architecture of a computing device that may be used in accordance with various embodiments described herein.

FIG. 5 is a block diagram showing an example architecture 500 of a computing device that may be used to generate the graphical user interfaces and/or the machine learning models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
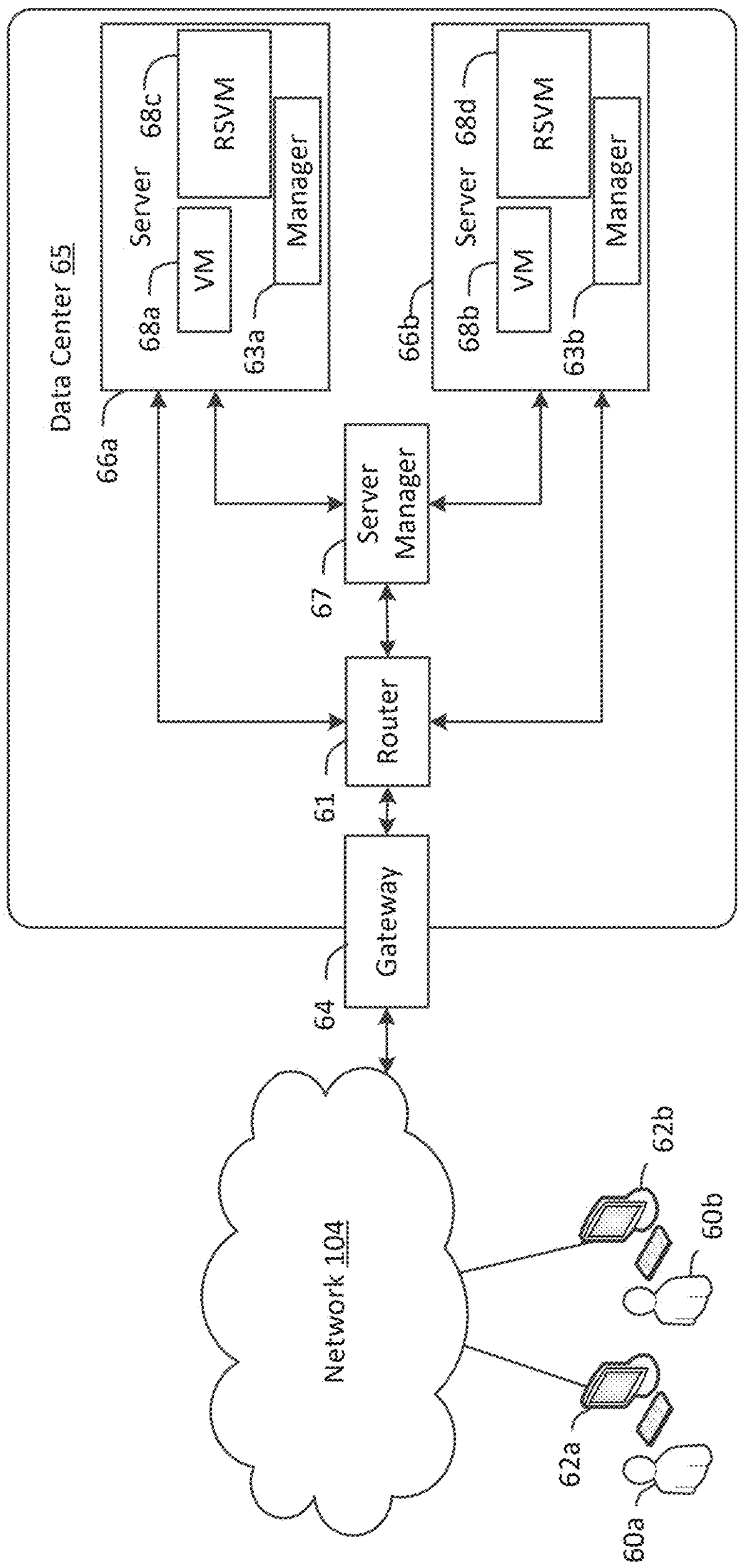
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, used to implement and distribute the infrastructure and web services offered by the provider network. The resources may, in some embodiments, be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may, in turn, run on top of a hypervisor).

A number of different types of computing devices may be used singly or in combination to implement the resources of the provider network in different embodiments, for example computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

FIG. 7 depicts another example process 700 for fine-tuning a pre-trained generative language model to reduce bias and increase generality using available signals, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 710, at which a pre-trained LLM may be fine-tuned using reinforcement learning with a two-step proximal policy operation (PPO) technique that uses a general corpus of reviews or question-and-answers (depending on the task for with the model is being trained) in a first training step of the PPO and vetted or high-quality reviews in the second training step of the PPO. Using the high quality and/or vetted reviews (or question-answer pairs) in the second step of the PPO may reduce bias in the model. Additionally, the general corpus and high quality/vetted corpus of reviews or question-and-answers may be determined on a per-item basis and the attributes of that item may also be encoded and provided to the model so that the model learns to describe relevant item features. In addition, the general corpus of reviews may be ranked based on available signals without requiring human annotation, as previously discussed herein.

Processing may continue at action 712, at which the LLM may be further fine-tuned using similar item review comparisons in order to generalize the model across different item categories. For example, similar items may be determined (e.g., using a nearest-neighbor algorithm) and an auto-generated review for one of the items may be selected as a held out review and the attributes described in the held-out review and the auto-generated reviews for other, similar items may be compared. The reward function may be used to increase the similarity between reviews of similar items on the basis of the auto-generated reviews of such items describing a similar set of attributes.

Processing may continue at action 714, at which a bandit approach may be used to further improve the model to refine reviews over time based on available signals. For example, multiple reviews may be automatically generated for a given item. These different auto-generated reviews may each be displayed to a different cohort of users. At action 716, the response of the users may be measured in terms of user feedback signals for different user cohorts. For example, users that saw auto-generated review A may have indicated that the review was helpful 214 times, while users that saw auto-generated review B may have indicated that the review was helpful only 27 times. These signals may be used by the objective function to further fine-tune the model (with the goal being to generate more useful reviews over less useful reviews).

Figure 8:
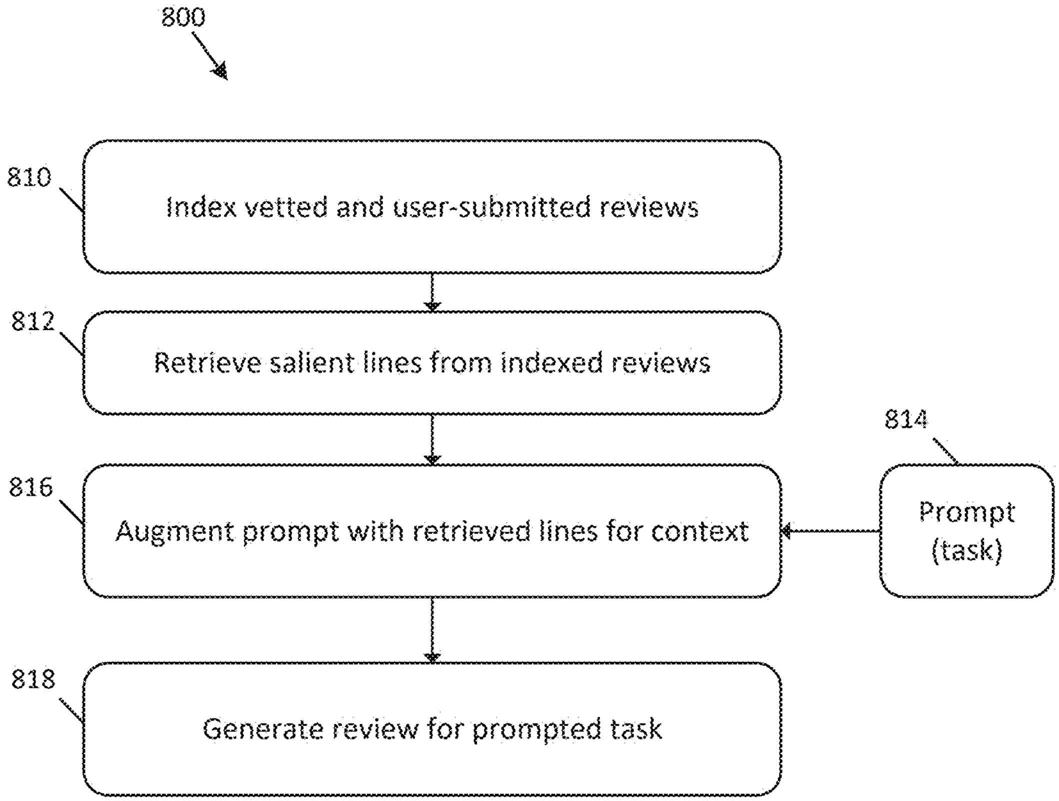
FIG. 8 depicts an example process for generating prompts for input into the fine-tuned generative language model, in accordance with various aspects of the present disclosure.

FIG. 8 depicts an example process 800 for generating prompts for input into the fine-tuned generative language model, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

At action 810, an indexer component may index the vetted and/or user reviews deemed high quality (e.g., those user reviews that are top-ranked reviews as determined based on various signals (e.g., ratio of likes to dislikes, etc.). In various examples, the reviews may be indexed at action 810 on a per-item basis.

At action 812, the salient lines from indexed reviews may be retrieved. For example, for each item attribute, a language model may be used to retrieve a sentence from one or more indexed reviews that are related to that item attribute. At action 814, a prompt that specifies a particular task for the fine-tuned generative language model may be received. The prompt may specify a task for the language model (e.g., answer a specific user-submitted question, write a review for Item ABC, etc.). For example, a language model-based classifier can be used (e.g., a BERT-based language model, ColBERT, etc.) to retrieve top-ranking lines or text from vetted and/or highest ranked (e.g., most "helpful" ratings and/or highest helpful-to-unhelpful (or likes-to-dislikes) ratio) reviews. Some other approaches that may be used to extract the salient lines from the indexed reviews may include, extractive summarization, identification of the most positive-sentiment text or text with the most frequently-mentioned terms and/or named entity recognition (NER) attributes/terms in existing reviews.

At action 816, the prompt may be augmented by adding the retrieved lines (retrieved at action 812) to the prompt so that salient lines are used to augment the prompt for the specific item. At action 818, the fine-tuned generative language model may take the augmented prompt as input and may generate an output for the prompted task. Automatically augmenting prompts as described in reference to FIG. 8 may improve the quality of the output by the generative language model.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the non-transitory, computer-readable medium and executed by the instruction execution system. In the context of the present disclosure, a "non-transitory computer-readable medium" can be any medium that can contain, store, or maintain the logic or application described herein for use by or in connection with the instruction execution system. The non-transitory computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:

determining, for a first item, first text data comprising a plurality of ranked user reviews of the first item;

determining, for the first item, second text data comprising a plurality of vetted reviews of the first item;

determining a first plurality of parameters for a generative language model using the first text data during a first training phase, the first training phase using a reward function of a reinforcement learning algorithm to determine the first plurality of parameters for the generative language model;

determining a second plurality of parameters for the generative language model using the second text data, wherein the second plurality of parameters are determined by modifying the first plurality of parameters during a second training phase, the second training phase using the reward function of the reinforcement learning algorithm;

inputting a first prompt into the generative language model comprising an instruction to generate a first review for the first item and a set of lines describing a context of the first item;

generating, by the generative language model using the second plurality of parameters, third text data comprising the first review for the first item; and displaying the third text data on a graphical user interface in association with a listing for the first item.

2. The computer-implemented method of claim 1, further comprising:

displaying the third text data to a first cohort of users;

determining first data representing a response of the first cohort of users to the third text data;

generating, by the generative language model, fourth text data comprising a second consensus review for the first item;

displaying the fourth text data to a second cohort of users;

determining second data representing a response of the second cohort of users to the fourth text data; and determining a third plurality of parameters for the generative language model based at least in part by using the first data and the second data to modify the second plurality of parameters.

3. The computer-implemented method of claim 1, further comprising:

determining a second item that is similar to the first item by comparing a first vector representation of the first item to a second vector representation of the second item in a shared vector space;

generating, by the generative language model, fourth text data comprising a second consensus review for the second item;

determining a first number of attributes described in the third text data;

determining a second number of attributes described in the fourth text data; and determining a third plurality of parameters for the generative language model based at least in part on a comparison of the first number and the second number.

4. A method comprising:

determining, for a first item, first text data comprising a plurality of user reviews of the first item;

inputting a first prompt into a generative language model, the first prompt comprising a request for a consensus review and one or more lines from a vetted review;

generating, by the generative language model, second text data comprising a first consensus review for the first item;

causing text represented by the second text data to be displayed on a graphical user interface in association with a listing for the first item;

generating, by the generative language model, third text data comprising a second consensus review for a second item;

determining a first number of attributes described in the second text data;

determining a second number of attributes described in the third text data; and updating the generative language model based at least in part on a comparison of the first number of attributes to the second number of attributes.

5. The method of claim 4, further comprising:

determining, for each user review of the plurality of user reviews, a score representing a rating of the respective user review; and determining a first plurality of parameters for the generative language model using the first text data and the scores.

6. The method of claim 5, further comprising:

determining, for the first item, third text data comprising vetted reviews of the first item; and determining a second plurality of parameters for the generative language model by modifying the first plurality of parameters based at least in part on the third text data and a first objective function.

7. The method of claim 4, further comprising:

determining a first vector representation of the first item;

determining a second vector representation of the second item; and determining a similarity between the first item and the second item based at least in part on a comparison of the first vector representation to the second vector representation.

8. The method of claim 4, further comprising:

displaying the text representing the second text data to a first cohort of users;

determining first data representing a response of the first cohort of users to the second text data;

generating, by the generative language model, third text data comprising a second consensus review for the first item;

displaying text representing the third text data to a second cohort of users;

determining second data representing a response of the second cohort of users to the third text data; and updating parameters for the generative language model based at least on the first data and the second data.

9. The method of claim 4, wherein the generative language model comprises a pre-trained language model, the method further comprising:

updating parameters of the pre-trained language model using reinforcement learning based at least in part on response data indicating responses of a plurality of users to the second text data.

10. The method of claim 4, further comprising:

determining, first attribute data for the first item stored in a data store, wherein the first attribute data comprises respective values for a plurality of attributes of the first item; and training the generative language model using the first attribute data and the first text data.

11. The method of claim 4, further comprising:

receiving third text data comprising a user question related to the first item;

generating, by the generative language model based at least in part on the second text data and first attribute data for the first item, fourth text data representing a predicted answer to the user question; and causing text representing the fourth text data to be displayed on a second graphical user interface in association with fifth text data, wherein the fifth text data indicates that the fourth text data has been automatically generated using a language model.

12. The method of claim 11, further comprising:

receiving a first input via the graphical user interface, the first input indicating that the fourth text data answered the user question or did not answer the user question; and re-training the generative language model based at least in part on the first input received via the graphical user interface.

13. A method comprising:

receiving first text data in a field of a graphical user interface, the first text data representing a user question regarding a first item;

generating, using a generative language model based at least in part on a first prompt and first attribute data describing a plurality of attributes of the first item, second text data comprising a predicted answer to the user question, wherein a first set of parameters of the generative language model are determined using a first reward function of a reinforcement learning algorithm;

causing the second text data to be displayed on the graphical user interface;

causing third text data to be displayed on the graphical user interface in association with the second text data, the third text data indicating that the second text data represents a prediction generated by a machine learning model;

generating, by the generative language model, fourth text data comprising a predicted answer to the user question regarding a second item;

comparing the second text data to the fourth text data; and updating the generative language model based at least in part on the comparing the second text data to the fourth text data.

14. The method of claim 13, further comprising:

displaying, on the graphical user interface, a first selectable graphical control, wherein selection of the first selectable graphical control indicates that a user indicated that the predicted answer was helpful; and re-training the generative language model based at least in part on the selection of the first selectable graphical control and the second text data.

15. The method of claim 13, further comprising:

determining first training data comprising fourth text data representing a plurality of questions regarding the first item and fifth text data representing a respective answer for each of the plurality of questions; and determining the first set of parameters of the generative language model based at least in part on the first training data and the first reward function.

16. The method of claim 15, further comprising:

determining second training data comprising sixth text data representing a plurality of vetted questions regarding the first item and seventh text data representing a respective vetted answer for each of the plurality of vetted questions; and determining a second set of updated parameters of the generative language model by updating the first set of parameters based at least in part on the second training data and the first reward function.

17. The method of claim 13, further comprising:

receiving fourth text data comprising a user-submitted response to the user question; and removing the second text data and the third text data from the graphical user interface based at least in part on receipt of the fourth text data.

18. The method of claim 13, wherein the generative language model comprises a pre-trained language model, the method further comprising:

updating parameters of the pre-trained language model using reinforcement learning based at least in part on a set of past questions and respective responses to each question of the set of past questions.

* * * * *